Oct. 7, 1952     R. B. COTTRELL     2,612,971
BRAKE BEAM STABILIZER
Filed March 17, 1949
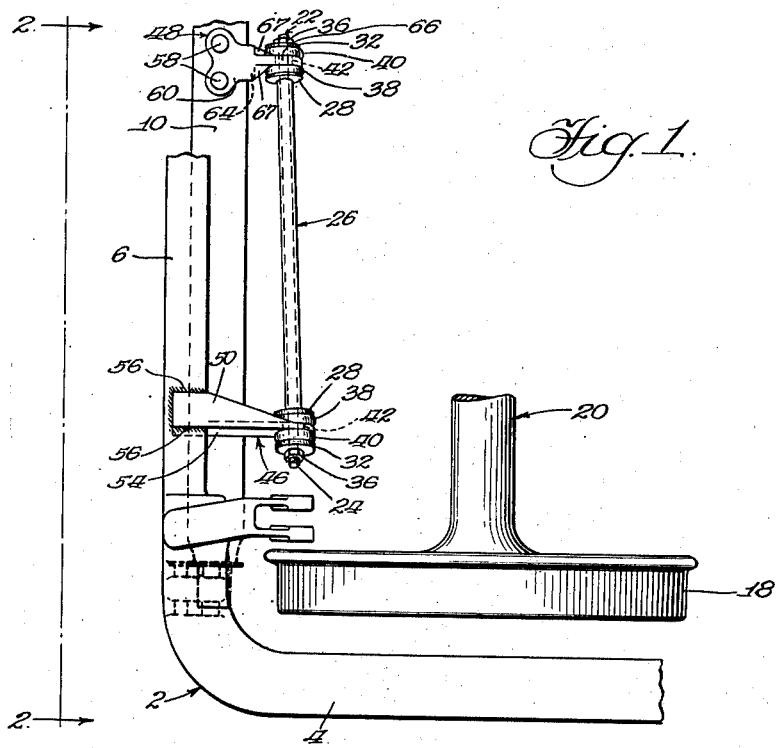
Fig. 1.
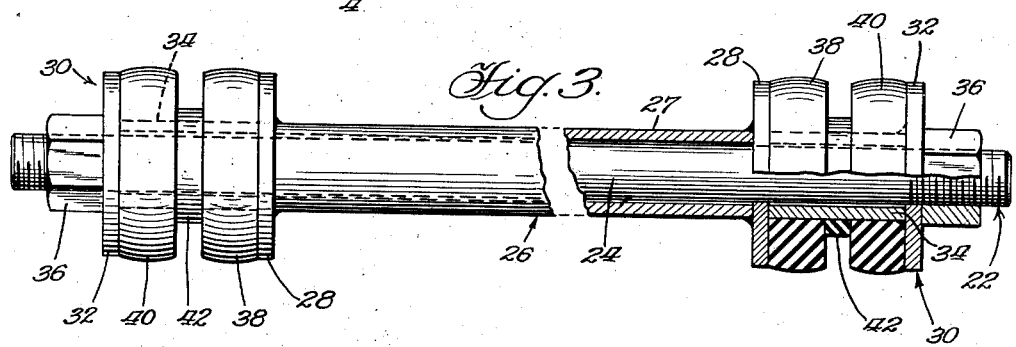
Fig. 3.
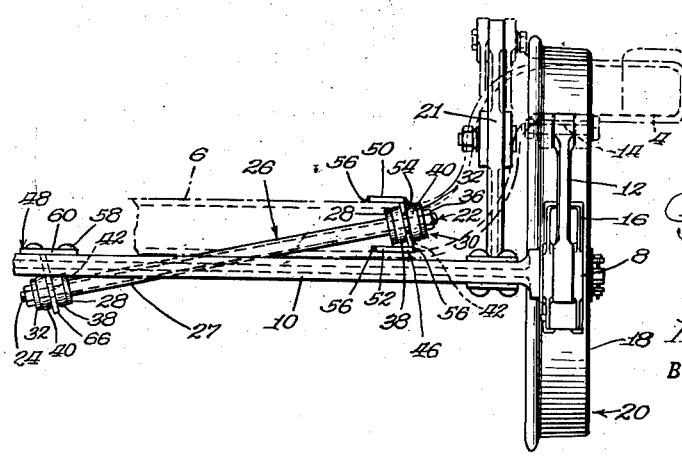
Fig. 2.
INVENTOR.
Robert B. Cottrell Patented Oct. 7, 1952

2,612,971

UNITED STATES PATENT OFFICE 2,612,971

BRAKE BEAM STABILIZER

Robert B. Cottrell, Chicago, Ill., assignor to American Steel Foundries, Chicago, Ill., a corporation of New Jersey Application March 17, 1949, Serial No. 81,979

10 Claims. (Cl. 188—207)

This invention relates to brake rigging for railway trucks and more particularly to a type commonly known as clasp brakes and incorporating brake beams carrying brake heads with shoes arranged to engage the treads of the wheels, the beams being pivotally suspended from the truck by hangers.

A principal object of the invention is to provide means for controlling and preventing swinging movements and lateral vibration of the brake rigging with respect to the truck frame while positively holding the rigging in released position.

A further object of the invention is to provide effective stabilizing means for controlling movements of the rigging without interfering with its proper functioning.

Another object of the invention is to design stabilizing means of simple, inexpensive and efficient form which may be incorporated in brake rigging in current use.

A further object of the invention is to provide novel means for releasing a brake beam after a braking application.

A different object of the invention is to design a stabilizer which is easy to assemble and disassemble.

A more specific object of the invention is to provide a stabilizer which is operative between a brake beam of the rigging and the truck frame, the stabilizer having universal resilient connections with the frame and beam, yieldingly resisting swing movements of the beam, and thus the rigging, and effective to move and hold the beam in released position.

These and other objects of the invention will be apparent from the specification and the drawings, wherein:

Figure 1 is a fragmentary top plan view of a railway car truck provided with brake rigging incorporating the invention;

Figure 2 is a fragmentary elevational view on line 2—2 of Figure 1; and

Figure 3 is a broken apart side view of the stabilizer with portions shown in radial cross section.

Describing the invention in detail, the truck, generally designated 2, comprises a side rail 4 at each side thereof and an integral end rail 6 at each end thereof. The frame carries beam type brake rigging, generally designated 8, which for purpose of illustration may be of the type shown in Patent No. 2,077,662, issued by the United States Patent Office on April 20, 1937, to Walter H. Baselt. The rigging includes a brake beam 10 extending transversely of the truck and suspended at each end thereof by a hanger 12, pivoted as at 14 at its upper end to the truck frame. The beam 10 carries a brake head and shoe assembly 16 at each end thereof in alignment with the tread of the associated wheel 18 of a wheel and axle assembly 20. The beam is movable by an actuating brake lever system 21 toward the wheel and axle assembly to engage the brake head and shoe assembly 20 with the wheel, as will be understood by those skilled in the art.

It will be noted that the connections between the beam and the hanger and between the hanger and the truck frame are not tight fitting even when new because of manufacturing tolerances, and even if these connections are initially tight, they frequently wear and loosen in service, thus, under certain conditions, the rigging may swing with respect to the truck.

The feature of the present invention is the provision of a control or stabilizing assembly 22 for resisting swinging movements of the rigging, said assembly having a resilient universal connection at one end with the beam and a similar connection at its other end with the truck. The assembly 22 is diagonally disposed and extends transversely of the truck longitudinally at an acute angle with respect to and inwardly of the beam and obliquely with respect to the transverse and longitudinal vertical center planes of the truck, and the assembly comprises a shaft or a rod 24 on which is mounted a housing 26 in the form of a pipe 27 (Figure 3) with a shoulder or washer 28 connected to each end thereof. A spacer member generally designated 30 is positioned on the rod at each end of the housing, each spacer member comprising a washer 32 connected to the outer end of a tubular element 34 which is sleeved over the rod in abutment at its inner end against the adjacent shoulder 28. The ends of the rod project outwardly of the spacer members and are provided with grip nuts or retaining means 36 threaded thereon for drawing the spacers against the respective shoulders. The elements 34 thus space the adjacent washers 28 and 32. A pair of resilient pads 38 and 40, such as rubber, is mounted on element 34 of each spacer member, the pads of each pair being spaced by a resilient bushing 42 mounted therebetween on the associated element 34. It will be understood that bushing 42 may be made integral with one of the pads 38 or 40 or may be formed in two parts on respective pads.

One end of the stabilizer has a resilient universal connection with a bracket 46 on the truck frame and the other end of the stabilizer is similarly connected to a bracket 48 which is secured to the brake beam at a point intermediate the ends thereof.

The bracket 46 in the present instance comprises spaced top and bottom webs 50 and 52 and an intervening diagonal web 54 interconnecting the top and bottom webs, said webs 50 and 52 being connected at corresponding ends to spaced top and bottom flanges of the end rail 6 as by welding at 56. The diagonal web 54 of the bracket 46 is received between the spaced pads 38 and 40 at the adjacent end of the stabilizer, the pad 38 being compressed between the adjacent washer 28 and the web 54, and the pad 40 being compressed between the adjacent washer 32 and the web 54. The bushing 42 between these pads is fitted into a complementary opening in web 54. Predetermined initial compression of the pads 38 and 40 is limited by abutment of the element 34 of the spacer 30 with the adjacent shoulder 28.

The bracket 48 is connected in any convenient manner, as by rivets 58, to the brake beam, the rivets extending through the beam and web 60 of the bracket 48. Web 60 is connected to a web 64 which is provided with a diagonally disposed lug 66 extending transversely of the beam. Additional connections between the lug and the web 64 are provided in the form of gussets 67, 67. The lug 66 is sleeved over bushing 42 between the pads 38 and 40 at the adjacent end of the stabilizer. The pad 38 is compressed between the lug 66 and the adjacent shoulder 28 and the pad 40 is compressed between the lug 66 and the adjacent shoulder 32. It will be noted that the spacers at opposite ends of the rod limit initial compression of the resilient pads 38 and 40 when the nuts at opposite ends of the rod are tightened to compress the pads.

In operation, movements of the brake rigging laterally of the truck are yieldingly restrained by compression of the resilient connections between the stabilizer and the frame and the brake beam. These connections are also compressible to resist movement of the beam longitudinally of the truck and thus afford positive means for biasing the brake rigging to released position thereof or returning the rigging to released position after a braking application. It will be understood that during movement of the rigging to brake applying position all of the pads 38 and 40 as well as the bushings 42, 42 are compressed.

It will be noted that the connection between the bracket 46 and the stabilizer is shown in the drawings located beneath the beam, however, this connection may be in horizontal alignment or above the beam.

To assemble my novel stabilizing arrangement with existing brake equipment the brackets 46 and 48 are connected to the rail 6 and brake beam 10, respectively. The housing 26 is interposed between the brackets. Pads 38 are then placed at each end of the housing against the adjacent washer 28. Bushings 42 may then be placed in the openings in walls 54 and 66 of brackets 46 and 48. The spacer members 30, 30 are then assembled with pads 40, 40 by mounting the latter on parts 34, 34 of said spacer members. Parts 34 may then be entered through respective bushings 42 and pads 38. The rod 24 may then be inserted through aligned openings in members 34, 34 and the pipe 27 of housing 26. Finally the nuts 36 may be threaded on the ends of the rod and tightened, thus urging members 34 against opposite ends of pipe 27 and simultaneously initially compressing the pads 38 and 40. To disassemble, the procedure is reversed. It will be observed that the brackets need not be removed to assemble or disassemble the equalizer whereby the assembly of the brake rigging is not affected.

Since the housing is movable with respect to the rod, forces are transmitted between the pads 38, 38 by the housing and the rod transmits forces between pads 40, 40. This arrangement provides for a better equalization of forces between the pads.

It will also be noted that the stabilizer is adjustable with respect to the brackets, that is, the rod, if required to be longer at one end of the housing than the other, may be moved to suit the condition. The provision of the housing also eliminates costly machining of the rod.

I claim:

1. In a brake arrangement for a railway truck comprising a frame and a wheel and axle assembly, brake rigging movably suspended from the frame and including a beam extending transversely of the truck and carrying brake means for engagement with said assembly, and means for controlling movements and releasing the rigging comprising an assembly extending lengthwise diagonally with respect to the beam and obliquely with respect to the vertical, longitudinal and transverse center planes of the truck and comprising spaced elements connected respectively to the beam and the truck frame, a housing extending between said elements, a rigid member extending through aligned openings in said housing and elements, resilient means sleeved over said member and interposed between said elements and said housing, other resilient means sleeved over the ends of said member outwardly of said elements and seated thereagainst, securing means mounted on said member outwardly of said last-mentioned resilient means for securing said housing, member, resilient means, and elements in assembled relationship and initially compressing said resilient means, and means interposed between said securing means and said housing for limiting initial compression of said resilient means.

2. In a brake arrangement for a railway car truck comprising a frame and a wheel and axle assembly, brake means for said assembly including a brake beam extending transversely of the truck, a bracket on the beam and a bracket on the frame, said brackets being spaced vertically and laterally from each other, a stabilizer extending transversely of the truck diagonally with respect to the beam between said brackets, universal resilient connections between the ends of the stabilizers and respective brackets, each connection comprising a web on the associated bracket and resilient pads carried by the stabilizer and receiving the web therebetween and compressed thereagainst, the angularity of the stabilizer with respect to the beam effecting, during longitudinal oscillation of the beam, rotational movement of said stabilizer in an axial plane of said stabilizer against the compression of all of the pads.

3. In a brake arrangement for a railway car truck comprising a frame member and a wheel and axle assembly, brake means for the assembly comprising a brake beam member extending longitudinally transversely of said truck generally parallel to said assembly, a stabilizer extending lengthwise at an acute angle to said beam member, and resilient universal connections between the ends of said stabilizer and respective members, each connection comprising a web on the related member extending substantially normal to the stabilizer and a pair of resilient pads carried by the stabilizer at opposite sides of the web and under compression against the web longitudinally of the stabilizer, said connection between the stabilizer and the beam occuring at substantially the center of the beam, the angularity of said stabilizer to said beam being effective to rotate the stabilizer in an axial plane thereof, to compress all of said pads between the stabilizer and associated webs during longitudinal oscillation of the beam to resist the same.

4. In a brake arrangement for a railway car truck comprising a frame member and a wheel and axle assembly, brake means for the assembly comprising a substantially horizontal brake beam member extending lengthwise transversely of the truck, a stabilizer extending lengthwise diagonally with respect to both the vertical and horizontal planes of said beam, and resilient connections between one end of the stabilizer and the beam member and between the opposite end of the stabilizer and the frame member, each connection comprising a portion on the associated member presenting oppositely facing surfaces extending angularly with respect to the longitudinal axis of the stabilizer and spaced resilient pads carried by the stabilizer and receiving the related portion therebetween and compressed against respective surfaces, the arrangement of said stabilizer and surfaces being effective to compress all of said pads during longitudinal oscillation of the beam member to resist the same.

5. In a brake arrangement for a railway car truck comprising a frame and a wheel and axle assembly, brake means therefor including a generally horizontal brake beam, a stabilizer extending downwardly diagonally of the beam, and resilient universal connections between the ends of the stabilizer and the beam and frame respectively, each connection comprising surfaces on a portion of the beam of frame extending angularly to the stabilizer, and rubber pads carried by the stabilizer at opposite sides of the associated portion and compressed against said surfaces.

6. In a brake arrangement for a railway car truck comprising a frame and a wheel and axle assembly, brake means therefor including a brake beam extending substantially parallel to said assembly, a stabilizer extending between the beam and the frame, said stabilizer being inclined to the horizontal transversely of the truck and extending at its lower end below said beam and at its upper end above the beam, a resilient connection between the lower end of the stabilizer and a portion of the beam, a resilient connection between the upper end of the stabilizer and a portion of said frame, said connections including pads carried by the stabilizer and compressed longitudinally thereof against the related portions.

7. A brake arrangement, according to claim 6, wherein the connection between said stabilizer and said portion of the beam is located at the center of the beam.

8. In a brake arrangement for a railway car truck comprising a frame and a wheel and axle assembly, brake means for said assembly comprising a brake beam extending lengthwise transversely of the frame and carrying friction means at each end for engagement with the tread of the adjacent wheel of said assembly, stabilizing means between the frame and the beam, and a resilient universal connection at one point between said stabilizing means and said beam and at a spaced point between said stabilizing means and said frame, said first mentioned point in the released position of the brake means being spaced farther from said assembly than said second-mentioned point longitudinally of the truck, each connection comprising spaced rubber pads embracing opposite sides of a portion of the brake beam or frame, said beam being movable toward and away from said assembly to apply and release said brake means, the arrangement of said connections effecting maximum compression of said pads during brake application.

9. In a brake arrangement for a railway car truck including a frame and a wheel and axle assembly, brake means for said assembly comprising a beam extending transversely of the frame alongside said assembly and carrying friction means for engagement with the treads of the wheels of the assembly, and stabilizing means for said beam having a pivotal connection at one point to the beam and having a pivotal connection at another point to said frame, said last-mentioned point being disposed closer to said assembly than said one point in the full release position of the said brake means and being disposed farther from said assembly than said one point in applied position of said brake means, said pivotal connections comprising resilient means biasing the beam to released position.

10. In a brake arrangement for a railway car truck having a wheel and axle assembly and a truck structure supported thereby; the combination of brake means for said assembly comprising a beam extending transversely of the truck and carrying friction means for engagement with the assembly to decelerate rotation of the same, and stabilizing means for said beam comprising a stabilizer member having a pivotal connection to the structure and having another pivotal connection to the beam, said stabilizer extending transversely of the structure, and said connections comprising resilient means for biasing the beam to release position.

ROBERT B. COTTRELL.

REFERENCES CITED

The following references are of record in the file of this patent:

UNITED STATES PATENTS

| Number | Name | Date |
|---|---|---|
| Re. 21,987 | Green | Dec. 30, 1941 |
| 1,776,257 | Hewitt | Sept. 23, 1930 |
| 2,199,128 | Grossman | Apr. 30, 1940 |
| 2,251,258 | Alden et al. | Aug. 5, 1941 |
| 2,322,266 | Willoughby | June 22, 1943 |

FOREIGN PATENTS

| Number | Country | Date |
|---|---|---|
| 472,919 | France | 1914 |